March 22, 1966  C. W. BROUGHTON  3,241,361
VOLUME MEASURING DEVICE

Filed Nov. 30, 1962  2 Sheets-Sheet 1

INVENTOR.
Clifton W. Broughton
BY

March 22, 1966  C. W. BROUGHTON  3,241,361
VOLUME MEASURING DEVICE

Filed Nov. 30, 1962  2 Sheets-Sheet 2

INVENTOR.
Clifton W. Broughton
BY

United States Patent Office 3,241,361
Patented Mar. 22, 1966

3,241,361
VOLUME MEASURING DEVICE
Clifton W. Broughton, Marshall, Tex., assignor to Atlas Chemical Industries, Inc., Wilmington, Del., a corporation of Delaware
Filed Nov. 30, 1962, Ser. No. 241,187
1 Claim. (Cl. 73—149)

The present invention relates to a device for measuring the volume of a material and more particularly to a device for measuring the skeletonal volume of a porous material.

The present invention is a useful tool in the determination of the volume and density of various porous or irregularly shaped materials, for example, oil well core samples, catalysts, ceramics, clays. The present device is also useful in the determination of the volume and density of various finely divided materials, for example, powders, granular materials and cereal grains.

In accord with the present invention, a device for determining the volume of a material is provided which comprises a first chamber, a second chamber, and a means for connecting and disconnecting the two chambers. Each of the chambers has a bellows portion. A means for determining the difference in pressure between the two chambers is connected to each chamber. The second chamber has a sealable port therein facilitating the introduction of a sample of the material to be tested inside the second chamber. An indicating scale is positioned near the second chamber so that linear expansion of the bellows portion may be determined. Preferably, each of the chambers has a gas port to facilitate a flushing of the system by allowing an inert gas to enter one chamber, flow through the connecting means, and flow out of the other chamber. The second chamber is suitably provided with a sample receiver and may also be equipped with a vacuum source in order that any gas contained in the sample may readily be removed and replaced by an inert gas.

The present invention is particularly useful in operations that utilize helium as an inert gas as it provides absolute leak-proof expandable chambers for the gas. The present device also facilitates out-gassing the sample of material (exposing the sample to concomitant applications of heat and vacuum) for the purpose of insuring the removal of adsorbed gases and water from the sample prior to a volume measurement.

Figure 1:
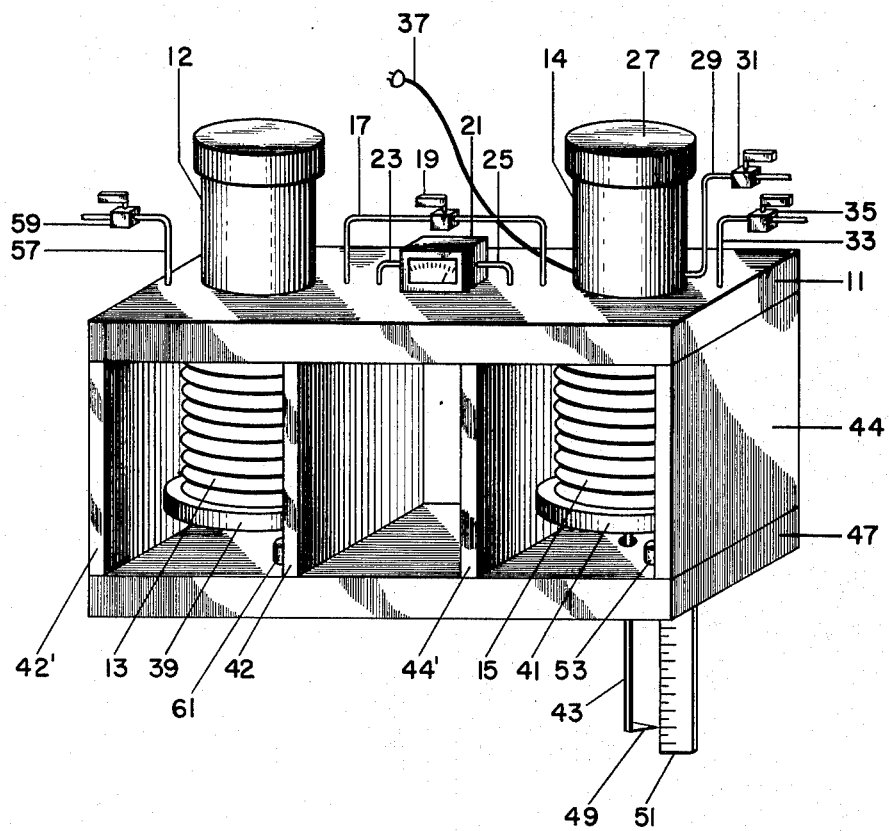
Figure 2:
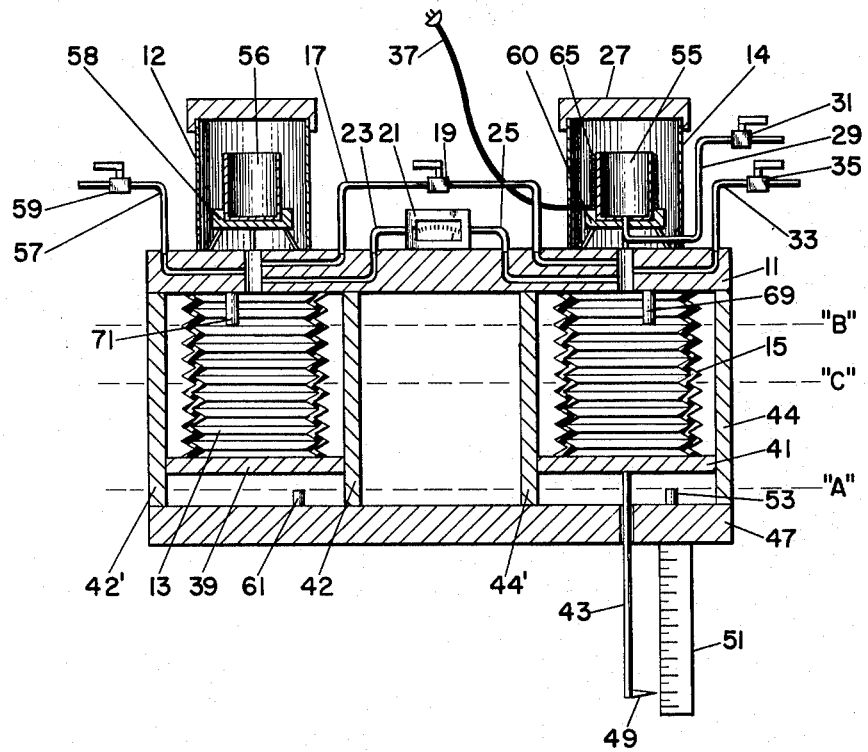

The invention will be described in greater detail in connection with the accompanying drawings which illustrate a specific embodiment of the invention and wherein similar elements are denoted by similar numbers. FIGURE 1 is a perspective view of the device embodying the present invention. FIGURE 2 is a vertical section taken along lines 2 and 2' of FIGURE 1. In addition, FIGURE 2 shows the various expanded and contracted positions of the bellows which are utilized in volume measuring operations containing the present device.

Looking now at FIGURE 1 in detail, chamber 12 has a bellowed portion 13 and chamber 14 has a bellowed portion 15. As shown chambers 12 and 14 are of similar dimensions. The bellows portions of chambers 12 and 14 are preferably fabricated of an inert material, for example, a plastic such as polyethylene or polypropylene. A fabric coated with an inert plastic material such as polyethylene or nylon is suitable. Chambers 12 and 14 are connected by line 17 containing valve 19. A differential pressure indicator 21 is positioned between the two chambers and is separately connected to the interior of each chamber by lines 23 and 25. Chamber 14 has a top opening fitted with a gas-tight cover 27. Gas line 29 containing valve 31 connects chamber 14 to a source (not shown) of inert gas, for example, helium. As shown chamber 14 also has an entering line 33 having a valve 35. Line 33 is adapted to be connected to a source of vacuum. Electrical line 37 enters chamber 14 and is adapted to be connected to an available source of electrical energy. Chambers 12 and 14 have rigid base members 39 and 41. Base member 39 is slidably positioned between guides 42 and 42'. Base member 41 is slidably positioned between guides 44 and 44'. Base member 41 has a rod member 43 extending therefrom. Rod member 43 passes through platform 47 and has an indicating portion 49 positioned to move along scale 51.

FIGURE 2 is a sectional view of the device of FIGURE 1, showing the interior arrangement of chambers 12 and 14. Chamber 14 contains a sample holder 55. A heating coil 65, is positioned adjacent sample holder 55. Heating coil 65 is electrically connected to electrical supply line 37. Sample holder 55 is positioned so that it is readily accessible from cover 27 of chamber 14. Preferably chambers 12 and 14 have the same dimensions and contain the same internal volume available for the expansion of gas. Chamber 12 may contain a container 56 and a mounting 58 of similar volume to the sample container 55 and mounting 60 contained by chamber 14. Since chamber 14 contains more equipment, for example, coil 65, electric line 37 and gas line 29, than chamber 12, the volume of chamber 12 available for gas may be adjusted by adding a solid material, such as, lead shot, in container 56 to equalize the volume available for gas. As shown chamber 12 has a set compressed stop position determined by a stop member 71 positioned therein. Chamber 14 has a similar set stop position determined by stop member 69. Chamber 12 and chamber 14 have set extended positions determined by stops 61 and 53.

In operation, the bellows portions 13 and 15 of chambers 12 and 14 are extended to position "A." Position "A" may be fixed by the use of stops such as 61 and 53 or by positioning the bottom of each chamber a set distance from a stationary point, e.g. bottom platform 47. Cover 27 is opened, a sample of material placed in sample holder 55; and cover 27 is closed. Valves 19, 31 and 59 may then be opened (valve 35 remaining closed) and a flow of inert gas, for example, helium, directed through the system entering it through line 29 and directed through sample holder 55. If desired, the sample may be outgassed prior to the inflow of inert gas by the simultaneous heating of the sample, by coil 65 and the drawing a vacuum through line 33. If a heating step is utilized, the temperature in each chamber must be equalized prior to a volume determination. This may easily be accomplished by passing an inert gas through the device via line 29, chamber 14, line 17, chamber 12, and line 57 until the temperature in each chamber is equal. The flow of the inert gas through the system may be terminated by closing valves 59 and 31. Connecting valve 19 is then closed and the two chambers 12 and 14 are compressed to position "B." Position "B" may be determined by internal stops 69 and 71 which determine a set and equal minimum distance that chamber base portions 39 and 41 can approach platform 11. Position "B" may be obtained by the contact of chamber base portions 39 and 41 with external stops or by a measuring means that would indicate when the chamber base portions are moved to a set position equally close to platform 11. At position "B," the position of indicator 49 in relation to scale 51 is noted, preferably scale 51 is adjusted to read zero. When in position "B," chamber 14, containing the sample of material to be tested, will have a higher pressure than chamber 12. This condition will be indicated by differential pressure indicator 21. While chamber 12 is maintained at position "B," bellows portion 15 of chamber 14 is expanded until the pressure difference between the two chambers is zero as indicated by differential pressure indicator 21. This places the base portion 41 of chamber 12 in read-out position "C." The relative position of indicator 49 and scale 51 are again noted. The difference in the scale readings made in positions "B" and "C" are noted. This value, dependent upon the linear movement of indicator 49, is directly proportional to the volume displaced in chamber 12 by the sample of material and therefore, scale 51 may be calibrated to read directly in units of cubic value. Scale 51 may readily be calibrated by operating the device using a standard sample of a known value and adjusting the units of scale 51 accordingly.

It will be understood that although the invention has been specifically described in connection with a device having chambers 12 and 14 of similar dimensions, that the two chambers may have different volumes provided the device is operated to read out (position "C") at an appropriate positive pressure differential rather than at a zero pressure differential, or if a suitable compensating adjustment is made in either the dimensions of the bellows, or the range of linear expansion of the bellows.

What is claimed is:

A device for determining the volume of a material comprising a first chamber and a second chamber, means for connecting and disconnecting said chambers, each of said chambers supplied with a valved port, said second chamber supplied with a sample holder, a means for heating said sample holder, said second chamber supplied with an additional valved port, each of said chambers having a bellows portion, means for determining a difference in pressure between said chambers, a sealable port into said second chamber providing a means for introducing a sample of material to be tested into said chamber, an indicating scale positioned so that the linear movement of the bellows portion of the second chamber may be determined and the bellows portion of said first chamber being movable between two fixed positions.

References Cited by the Examiner

UNITED STATES PATENTS

| | | | |
|---|---|---|---|
| 1,945,203 | 1/1934 | Schiske | 73—290 |
| 2,116,636 | 5/1938 | Neumann | 73—290 |
| 2,450,772 | 10/1948 | Watkins | 73—410 X |
| 2,504,143 | 4/1950 | Moore | 73—19 X |
| 2,531,083 | 11/1950 | Smith | 73—19 |
| 2,667,782 | 2/1954 | Shea | 73—149 |
| 3,060,724 | 10/1962 | Smith et al. | 73—149 |
| 3,113,448 | 12/1963 | Hardway et al. | 73—149 X |

OTHER REFERENCES

Bulletin 786–A of Beckman Instruments, Inc., September 1961.

RICHARD C. QUEISSER, *Primary Examiner.*